(12) United States Patent
Srinivasan et al.

(10) Patent No.: US 10,445,209 B2
(45) Date of Patent: Oct. 15, 2019

(54) PRESCRIPTIVE ANALYTICS BASED ACTIVATION TIMETABLE STACK FOR CLOUD COMPUTING RESOURCE SCHEDULING

(71) Applicant: Accenture Global Solutions Limited, Dublin (IE)

(72) Inventors: Madhan Kumar Srinivasan, Karnataka (IN); Arun Purushothaman, Karnataka (IN); Manish Sharma Kolachalam, Karnataka (IN); Michael S. Eisenstein, Seattle, WA (US)

(73) Assignee: Accenture Global Solutions Limited, Dublin (IE)

( * ) Notice: Subject to any disclaimer, the term of this patent is extended or adjusted under 35 U.S.C. 154(b) by 178 days.

(21) Appl. No.: 15/811,339

(22) Filed: Nov. 13, 2017

(65) Prior Publication Data

US 2019/0079848 A1    Mar. 14, 2019

(30) Foreign Application Priority Data

Sep. 8, 2017  (IN) .............................. 201741031852

(51) Int. Cl.
*G06F 15/173* (2006.01)
*G06F 11/34* (2006.01)
*G06F 9/50* (2006.01)
*G06F 16/248* (2019.01)
*G06F 11/07* (2006.01)
(Continued)

(52) U.S. Cl.
CPC ........ *G06F 11/3452* (2013.01); *G06F 9/5033* (2013.01); *G06F 9/5077* (2013.01); *G06F 11/0712* (2013.01); *G06F 11/301* (2013.01);

*G06F 16/248* (2019.01); *H04L 67/1012* (2013.01); *H04L 67/1029* (2013.01);
(Continued)

(58) Field of Classification Search
CPC .. G06F 11/3452; G06F 16/248; G06F 9/5033; G06F 9/5077; G06F 11/0712; G06F 11/301; G06F 9/485; G06F 9/5072; H04L 67/1012; H04L 67/1029; H04L 67/22
USPC ........................................................ 709/226
See application file for complete search history.

(56) References Cited

U.S. PATENT DOCUMENTS

| 5,907,675 A | 5/1999 | Aahlad |
| 8,336,049 B2 * | 12/2012 | Medovich ........... G06F 9/45533 718/1 |
| 8,612,599 B2 | 12/2013 | Tung et al. |

(Continued)

OTHER PUBLICATIONS

Australian Patent Office, Examination Report No. 1 for Australian Application No. 2017261531 dated May 7, 2018, pp. 1-8.
(Continued)

*Primary Examiner* — Atta Khan
(74) *Attorney, Agent, or Firm* — Brinks Gilson & Lione (57) ABSTRACT

A multi-layer activation timetable stack may generate prescriptive activation timetables for controlling activation states for computing resources. An input layer of the activation timetable stack may generate time-scaled pattern data. A transformation layer may identify trends and variables at era timescales. A data treatment layer may flag activation states based on the trends identified at the era timescales. Once the activation states a flagged, the prescriptive engine layer may generate an activation timetable that may be used to control computing resource activation prescriptively.

20 Claims, 5 Drawing Sheets

(51) Int. Cl.
  *G06F 11/30*  (2006.01)
  *H04L 29/08*  (2006.01)
  *G06F 9/48*   (2006.01)
(52) U.S. Cl.
  CPC .............. *H04L 67/22* (2013.01); *G06F 9/485* (2013.01); *G06F 9/5072* (2013.01)

(56) References Cited

U.S. PATENT DOCUMENTS

| | | | |
|---|---|---|---|
| 8,862,914 | B2 | 10/2014 | Kansal et al. |
| 9,367,340 | B2* | 6/2016 | Wang ..................... G06F 9/455 |
| 2010/0269109 | A1 | 10/2010 | Cartales |
| 2011/0055385 | A1 | 3/2011 | Tung et al. |
| 2011/0302578 | A1* | 12/2011 | Isci ....................... G06F 9/5077 718/1 |
| 2012/0096165 | A1* | 4/2012 | Madduri ............... G06F 9/5011 709/226 |
| 2013/0042123 | A1 | 2/2013 | Smith et al. |
| 2013/0080641 | A1* | 3/2013 | Lui ......................... H04L 67/10 709/226 |
| 2013/0262685 | A1* | 10/2013 | Shelton ................... G06F 1/206 709/226 |
| 2014/0136269 | A1* | 5/2014 | Wasser ............. G06Q 10/06312 705/7.22 |
| 2015/0278061 | A1* | 10/2015 | Siciliano ............... H04L 47/762 702/186 |
| 2016/0044035 | A1* | 2/2016 | Huang ................ H04L 63/0272 726/4 |
| 2016/0232022 | A1 | 8/2016 | Kania et al. |
| 2019/0179675 | A1 | 6/2019 | Srinivasan et al. |
| 2019/0205150 | A1 | 7/2019 | Srinivasan et al. |

OTHER PUBLICATIONS

Australian Patent Office, Examination Report No. 2 for Australian Application No. 2017261531 dated Nov. 22, 2018, pp. 1-3.
Australian Patent Office, Notice of Amendment to the Patent Request for Australian Application No. 2017261531 dated Mar. 15, 2019, pp. 1-2.
Extended European Search Report dated Jun. 4, 2018, pp. 1-8. Issued in European Application No. 17202112.3, European Patent Office, The Hague, The Netherlands.
Amazon Cloud Watch—Cloud & Network Monitoring Services, https://aws.amazon.com/cloudwatch/?nc1=h_ls, dated Jun. 29, 2017, 5p.
Cloudyn for Enterprise, https://www.cloudyn.com/enterprise/, dated Jun. 30, 2017, 3p.
How Do I Stop and Start EC2 Instances at Regular Intervals using AWS Lambda, https://aws.amazon.com/es/premiumsupport/knowledge-center/start-stop-lambda-cloudwatch/, dated Jun. 29, 2017, 5p.
Husain Bohra, Ata E., et al., *"VMeter: Power Modelling for Virtualized Clouds,"* Department of Computer Science and Engineering, University at Buffalo, State University of New York, NY), aehusain,vipin@buffalo.edu, pp. 1-8. (2010).
Trusted Advisor Best Practices (Checks), https:/aws.amazon.com/es/premiumsupport/trustedadvisor/best-practices/, dated Jun. 29, 2017, 6p.
Xiao, Zhen, et al., *"Dynamic Resource Allocation using Virtual Machines for Cloud Computing Environment,"* IEEE Transactions on Parallel and Distributed Systems, vol. 24:No. 6, (2013), pp. 1107-1117.
European Patent Office, European Search Report for European Application No. 17202112.3 dated May 21, 2019, pp. 1-8.
U.S. Appl. No. 16/154,174, filed Oct. 8, 2018.
U.S. Appl. No. 16/219,435, filed Dec. 13, 2018.
U.S. Appl. No. 16/285,539, filed Feb. 26, 2019.
U.S. Appl. No. 16/411,064, filed May 13, 2019.
U.S. Appl. No. 16/423,720, filed May 28, 2019.

\* cited by examiner

PRESCRIPTIVE ANALYTICS BASED ACTIVATION TIMETABLE STACK FOR CLOUD COMPUTING RESOURCE SCHEDULING

PRIORITY CLAIM

This application claims priority to, and incorporates by reference in its entirety, Indian Patent Application Serial No. 201741031852, filed Sep. 13, 2017, and entitled Prescriptive Analytics Based Activation Timetable Stack for Cloud Computing Resource Scheduling.

TECHNICAL FIELD

This disclosure relates to cloud computing resource scheduling via a prescriptive analytics based activation timetable stack.

BACKGROUND

Rapid advances in communications and storage technologies, driven by immense customer demand, have resulted in widespread adoption of cloud systems for managing large data payloads, distributed computing, and record systems. As one example, modern enterprise systems maintain data records many terabytes in size. Improvements in tools for cloud resource allocation and consumption prediction will further enhance the capabilities of cloud computing systems.

DETAILED DESCRIPTION

In various cloud computing systems, computing resources such as virtual machines, memory, processor cores, or other computing resources may be scheduled for planned utilization. In some cases, a computing resource scheduled for planned utilization may remain unutilized due to an unpredicted lack of demand. Further, in some cases, an unduly large set of computing resources may be scheduled because of uncertainty in computing resource demand. As a result, in many cases, excess computing resources may be scheduled leading to inefficient utilization of resources. In other cases, uncertainty may lead to insufficient scheduling of resources, which in turn, may lead to over utilization of scheduled resources, performance degradation, and/or service interruption.

Accordingly, increased scheduling accuracy provides a technical solution to the technical problem of system inefficiency by increasing the utilization of cloud computing resources. The activation timetable stack techniques and architectures described below may be used to accurately prescribe future cloud activation recommendations based on data patterns at different timescales including one or more era timescales, e.g. minute timescales, hourly timescales, daily timescales, weekly timescales, monthly timescales, seasonal timescales, annual timescales, time-invariant contributions, or other timescales. Further, data analysis may include data sources such as, utilization data, expenditure report data for resource reservation/activation, computing resource consumption metric data, activation request data, functional grouping data, topological or relationship data, tagging data, or other metadata. Thus, the activation timetable stack may provide prescriptive analytical resource scheduling taking into account resource utilization patterns present on multiple timescales.

Thus, the disclosed activation timetable stack techniques and architectures improve the operation of the underlying hardware by increasing computing efficiency and provide an improvement over existing solutions. The activation timetable stack may analyze historical utilization data, tagging data and consumption metric data to predict future utilization and produce prescriptive recommendations. Accordingly, the disclosed activation timetable stack techniques and architectures provide an improvement over existing market solutions. Utilization data, may include, for example, historical data related to usage or activation of cloud computing resources, e.g., resource allocation history, activation/reservation/committed-use history data, expenditure report data for resource reservation/activation/committed-use, processor activity, memory usage history, computing cycles, data throughput, or other utilization metrics, seasonal usage cycles e.g., holiday schedules, daily usage cycles, weekly usage cycles, quarterly usage cycles or other data. Tagging data may include computing resource specific data. For example, tagging data may include data provided by an operator, provisioning or configuration management system, or an analyzed system detailing functional groupings (e.g., project-specific allocations, hardware (including virtualized hardware) marked for a specific purpose, availability zones, operating systems), quality of service requirements, minimum allocations, or other tagging data. Consumption metric data may include computing resource specific cost metrics such as expenditure-per-time or resource-per-time metrics.

Figure 1:
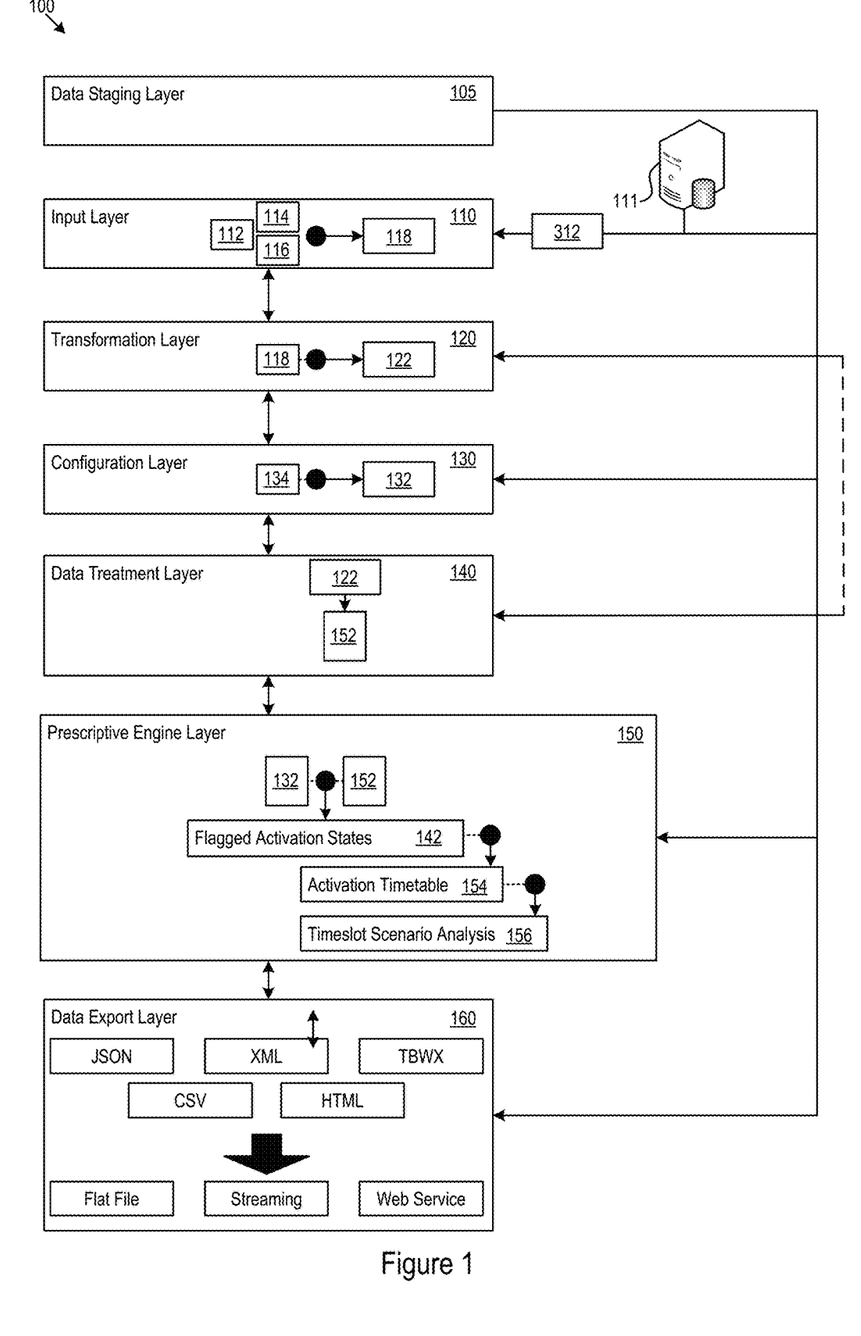
FIG. 1 shows an example multiple layer activation timetable stack.

FIG. 1 shows an example multiple layer activation timetable stack 100. In this example, the activation timetable stack 100 includes a data staging layer 105, an input layer 110, a transformation layer 120, a configuration layer 130, a data treatment layer 140, a prescriptive engine layer 150, and a data export layer 160. The activation timetable stack 100 may include a multiple-layer computing structure of hardware and/or software that may provide prescriptive analytical recommendations (e.g., power scheduling for virtual machines or other computing resource activation scheduling) through data analysis.

In some implementations, as discussed below, iCPS™—an Intelligent Cloud Power Scheduler™ developed by Accenture® Bangalore may be operated as the activation timetable stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the activation timetable stack 100, the data staging layer 105 may provide the input layer 110 with storage resources to store time-scaled pattern data within a database. Hence, the memory access layer 105 may provide a hardware resource, e.g., memory storage resources, to the input layer 110.

Figure 2:
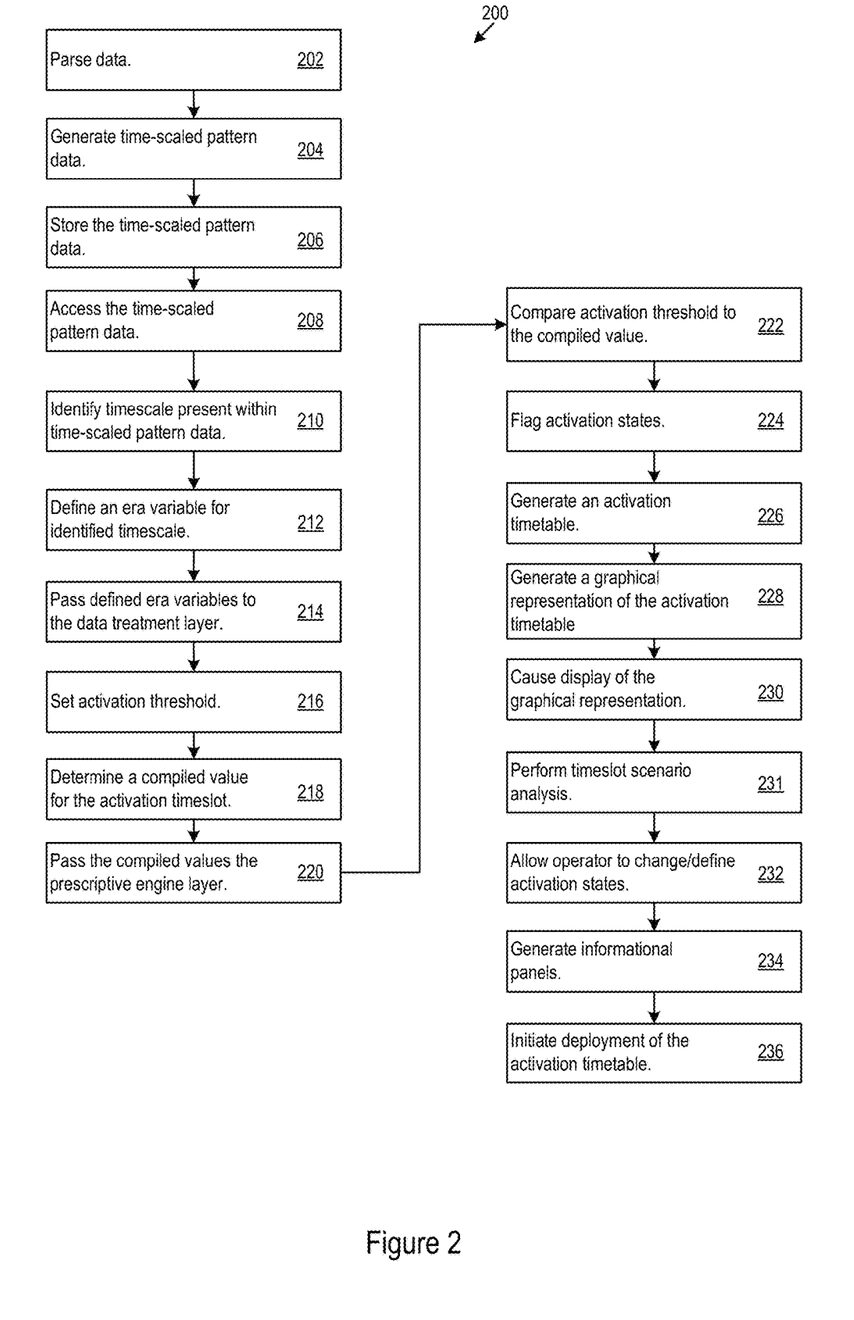
FIG. 2 shows example activation timetable stack logic.

In the following, reference is made to FIG. 1 and the corresponding example activation timetable stack logic (ATSL) 200 in FIG. 2. The logical features of ATSL 200 may be implemented in various orders and combinations. For example, in a first implementation, one or more features may be omitted or reordered with respect to a second implementation. At the input layer 110 of the activation timetable stack 100, the ATSL 200 may parse historical utilization data 112, resource consumption data 114, and tagging data 116 (202) to generate time-scaled pattern data 118 (204). In some cases, the historical utilization data 112, resource consumption data 114, and tagging data 116 may be received via communication interfaces (e.g., communication interfaces 312, discussed below). The historical utilization data 112, resource consumption data 114, and tagging data 116 may be accessed at least in part, e.g., via the communication interfaces 312, from data sources 111, which may include, cloud compute utilization databases, cloud expenditure databases, master virtual machine cost databases, committed-use history databases, virtual machine family/template description data, infrastructure/project tags or other data sources. The historical utilization data 112 may be provided by cloud compute utilization databases, cloud expenditure databases, committed-use history databases, or other utilization data sources. The resource consumption data 114 may be provided by cloud expenditure databases, master virtual machine cost databases, virtual machine family/template description data, or other resource consumption data sources. The tagging data 116 may be provided by virtual machine family/template description data, infrastructure/project tags or other tagging data sources. To parse the received data 112, 114, 116, the input layer 110 may analyze time components of the received data to determine time related patterns. Time-independent data, such as, non-conditional functional group assignments, may be applied to all activation timeslots (e.g., time periods for which a computing resource may be activated or reserved from a cloud computing service). However, temporal or otherwise dynamic functional groupings may be correlated to corresponding timescales. For example, in an illustrative scenario, a specific virtual machine may shift among multiple functional assignments in accord with a weekly timescale schedule. The input layer 110 may generate time-scaled pattern data in accord with the schedule.

In another illustrative scenario, consumption metric data may be time-dependent. For example, specific cloud providers may request premiums for computing resources during peak computing times, while the same providers may eschew such premiums for non-peak scheduling. Accordingly, consumption metric data may be applied in time-dependent or time-independent fashions.

Once the time-scaled pattern data is generated, the input layer 110 may store, via a database operation at the data staging layer 105, the time-scaled pattern data 118 (206). For example, the time-scaled pattern data 118 may be stored on storage dedicated to the ATSL 200. Additionally or alternatively, the time-scaled pattern data 118 may be stored on a shared database or cloud storage. Accordingly, the data staging layer 105 may further access network resources (e.g., via communication interfaces 312, discussed below) to implement memory resource provision to the other layers. In an example implementation, the ATSL 200 may be defined within a Revolution-R environment. However, other design platforms may be used.

The transformation layer 120 may access the time-scaled pattern data 118 using a memory resource provided by the data staging layer 105 (208). For example, the data staging layer 105 may provide a memory read resource (such as a SQL database read resource) to the transformation layer 120 to allow access to the time-scaled pattern data 118.

After accessing the time-scaled pattern data 118, the transformation layer 120 may process the time-scaled pattern data 118 to identify one or more era timescales (e.g., timescales including time-invariant contributions) present within the data (210). For example, the transformation layer 120 may apply various frequency analyses to the data to determine periodic, aperiodic, and/or time-invariant trends. Additionally or alternatively, the transformation layer 120 may apply rule-based analyses such as holiday schedules, operational hours, or annual enterprise cycles that may be expressly defined by rules rather than through inferential analysis.

Once era timescales are identified, the transformation layer may define an era variable 122 for the identified timescale (212). The era variable may represent a measure of trends occurring at the era variable timescale. For example, the era variable may include one or more states and an associated value for that state. As an illustrative example, a seasonal variable may be in a "winter" state. The associated value may include a maximum value of utilization or a percentile utilization for a particular computing resource during one or more winter seasons. In some cases, the transformation layer 120 may remove outliers or otherwise non-representative data before determining the associated values. In various implementations, the associated value is defined/selected to represent a contribution to potential utilization for membership within the particular state for the era variable. As another illustrative example, for a weekly era variable, the state may include individual repeated time periods (e.g., days, hours) within the week to capture repeating weekly trends. The transformation layer 120 may pass the defined era variables to the data treatment layer 140 (214).

The configuration layer 130 may set an activation threshold 132 for computing resources in response to a threshold selection value 134 received via a user interface (e.g., user interface 318, below) or communication interfaces (e.g., communication interfaces 312, below) (216). In some cases, an activation threshold 132 may include a threshold utilization level below which the computing resource may not be scheduled to avoid expenditures for computing resources with below-threshold utilization. The activation threshold may be set globally for all computing resources or specifically for functional groups or individual resources. Additionally or alternatively, quality of service demands may drive activation threshold setting for particular resources. In some cases, an operator may direct implementation of a global default threshold. Additionally or alternatively, the operator may supplement the global default threshold with specific functional group level or individual resource level activation thresholds.

The threshold selection value 134 may be used by the configuration layer 130 to determine the activation threshold for a particular computing resource. In some cases, the threshold selection value 134 may include an express operator designation of an activation threshold for specified computing resources. Additionally or alternatively, the threshold selection value 134 may include an indirect indication of an activation threshold. For example, the threshold selection value 134 may include a target efficiency differential for computing resources (e.g., global or specific). The efficiency differential may include a difference in ratios of utilization time to non-utilization time for computing resources. In some cases, an efficiency differential may further weight for consumption metric data. Accordingly, non-utilization of comparatively high expenditure computing resources may reduce an efficiency more than non-utilization of comparatively low expenditure computing resources. Additionally or alternatively, the threshold selection value may indicate an expenditure target. In response, the configuration layer may set an activation threshold to meet the expenditure target. In some cases, the set activation threshold may meet the expenditure target, while also meeting other metrics such as maximized performance, lowest achievable activation thresholds, meeting an additional target efficiency ratio, or other metric.

The data treatment layer 140 may determine a compiled value for the activation timeslot based on the associated values of the era variables (218). The data treatment layer may combine (e.g. sum, weighted sum, or otherwise compile) the associated values. For example, the data treatment layer 140 may compile the associated values for the states of each era variable for the activation timeslot being flagged. Accordingly, the data treatment layer may generate an upper value (e.g., a maximum value among the associated values) and a P value (e.g., a value at a selected percentile among the associated values). As discussed below, the data treatment layer may compare the compiled values (e.g. the upper and P values) to the activation threshold to determine an activation state for the activation timeslot. The data treatment layer 140 may pass the compiled values to the prescriptive engine layer 150 (220).

The prescriptive engine layer 150 may compare the activation threshold 132 to the compiled value 152 (222). Based on the comparison, the prescriptive engine layer 150 may flag activation states 142 for various activation timeslots (224). The activation timeslots may include time periods for which a computing resource may be activated/recovered. The activation states may include a prescriptive recommendation of whether a computing resource may be activated/reserved for a particular activation timeslot. The activation states may apply globally, to specific function groups, individual computing resources, or a combination thereof. Accordingly, for a flagged activation state (e.g., active/inactive, scheduled/unscheduled, reserved/unreserved) the prescriptive engine layer 150 specifies one or more computing resources and an activation timeslot over which the activation state applies.

In an illustrative scenario, the prescriptive engine layer 150 may apply the example algorithm in Table 2, below to determine the flagged activation state. The example algorithm recommends deactivation of computing resources with upper values below an "OFF Threshold" (e.g., an activation threshold) and for those computing resources for which P values for a selected percentile are below the OFF Threshold.

TABLE 2

Example Activation State Flagging Algorithm

| | Description |
|---|---|
| Example Algorithm | IF Compiled Upper (Timeslot) < OFF threshold OR IF Compiled Upper (Timeslot) > OFF threshold AND P < OFF threshold THEN OFF ELSE ON |

Using the flagged activation states, the prescriptive engine layer 150 may generate an activation timetable (226). The activation timetable 154 may specify the activation states for computing resources for the timeslots within a given period. In some cases, the activation timetable 154 may specify activation states for individual computing resources. Further, the activation states within the activation timetable may be specified for timeslots, but the activation states may define trends at one or more era timescales, including when the timeslots correspond to a different timescale than the era timescale. However, the activation timetable may not necessarily define a trend at every defined era variable.

The prescriptive engine layer 150 may generate a graphical representation (e.g., example graphical representations 410, 510) of the activation timetable (228) and cause a user interface (e.g., user interface 318, a remote user interface on a network-connected device, or other user interface) to display the graphical representation (230).

The prescriptive engine layer may perform a timeslot scenario analysis 156 on the activation states within the activation table (231). The timeslot scenario analysis 156 may include an intelligent bucket analysis, a machine-learning analysis, or other analysis to alter the activation states to establish a bias for particular activation state characteristics. For example, the change analysis may include a 5/3 intelligent bucket analysis that analyzes a particular activation state of a timeslot based on the activation states of the preceding two timeslots and the subsequent two timeslots (e.g., the surrounding/adjacent timeslots). Based on these surrounding timeslots, the intelligent bucket analysis may change the particular activation state to avoid isolated activation states, (e.g., an OFF surrounded by ONs or vice versa). In some cases, other analyses (e.g., including more or fewer surrounding timeslots—7/4, 3/1) may be used. Changing the surrounding timeslots included in the analysis may alter the number of activation states that are changed as a result of the intelligent bucket analysis (e.g., a change in the level of smoothing and expected utilization).

The user interface, e.g., via interaction with the graphical representation, may allow an operator to manually define/change activation states within the activation timetable (232). The prescriptive engine layer 150 may present the graphical representation such that it displays timescales larger than the system granularity. For example, the timetable may be "zoomed out" such that era timescales are visible on graphical representation. The operator may make selections for manipulation at any of the displayed timescales (e.g., at the activation timeslot scale and/or at era timescales). In the example, the timeslots are displayed as relative values. In some cases, the values may be mapped to time standards such as Greenwich Mean Time (GMT) and/or Coordinated Universal Time (UTC) to allow for time synchronization to host clocks. In some cases, the host interface may provide a time standard. The activation timetable may be mapped to the provided standard.

Figure 4:
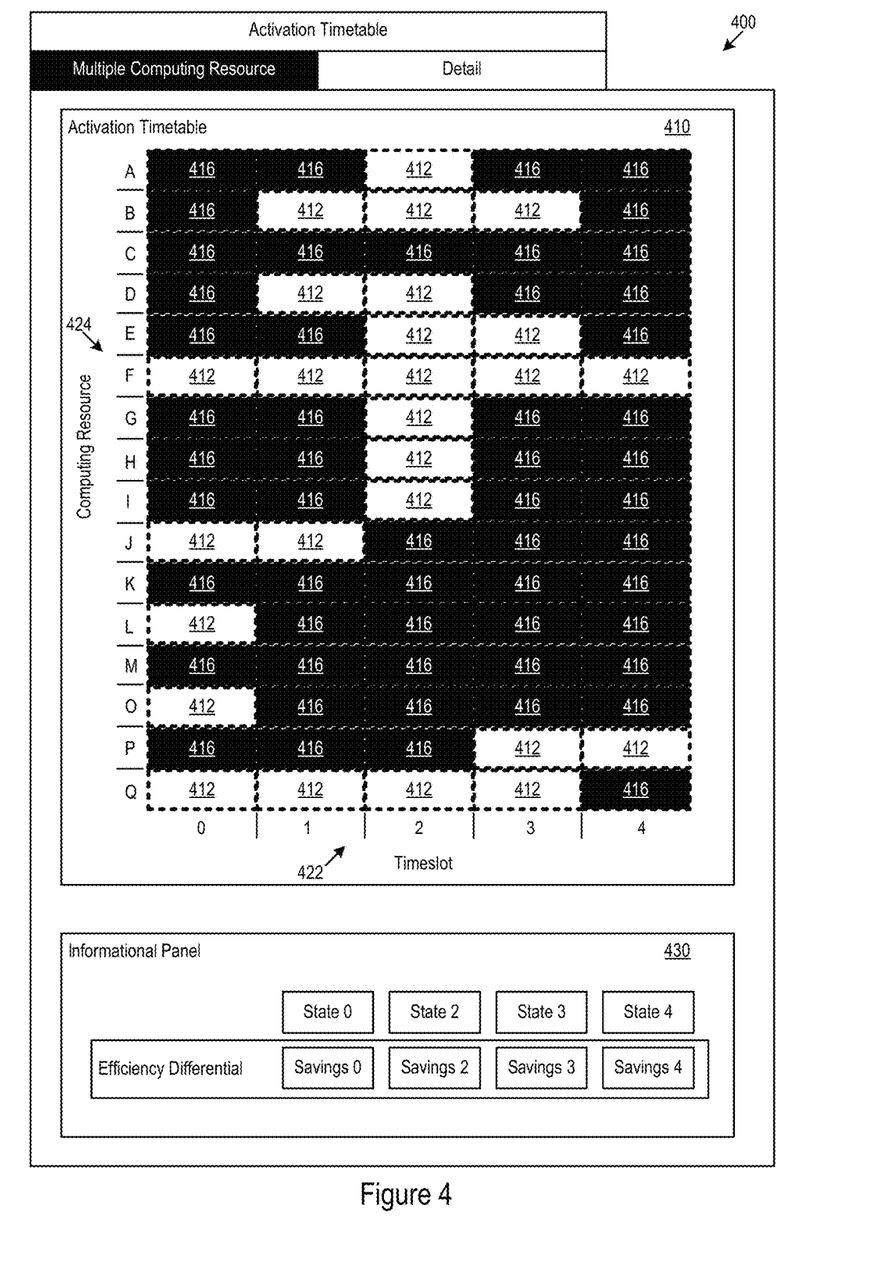
FIG. 4 shows an example user interface.

Additionally or alternatively, the prescriptive engine layer 150 may generate informational panels (e.g., example informational panel 430), which may be displayed alongside the graphical representation (e.g., as shown in example user interface 400) (234). The informational panels may display predicted efficiency ratios that may result from changes to the activation timetable. For example, the informational panels may display outcomes from changing the activation threshold, completely deactivating the activation threshold and/or the activation timetable, excluding particular groups of computing resources from the effects of the activation timetable, or other alterations to the operation of the activation timetable stack 100. In some cases, the informational panels may accept input from an operator to implement an alteration corresponding to one or more of the displayed outcomes.

After generation of the activation timetable, the ATSL 200 may initiate deployment of the activation timetable by causing the network interface circuitry to send the activation timetable to a host interface for control of the computing resources (238). For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the computing resources. The ATSL 200 may also use a scheduling proxy system that uses the activation timetable data to maintain schedules, calling the service provider's application programming interfaces for each activation control action defined by the activation timetable data source. Accordingly, a client may use the host interface to reserve/activate computing resources. In some cases, reservations/activations may lead to expenditures accruing against the client. Accordingly, efficiency may be increased by specifying reservations to the timing granularity (e.g., minimum granularity) supported by the host interface. In some cases, when the system granularity is the same or less than the granularity supported by the host interface, the activation timetable may be provided to the host interface with detail at the granularity of the host interface. In some cases, where the system granularity is greater than the granularity supported by the host interface, the activation timetable may be interpolated to allow for activation state specification at the granularity supported by the host interface.

In some cases, the ATSL 200 may initiate deployment via the data export layer 160. The data export layer 160 may format the activation timetable in one or more formats for transfer. For example the data export layer 160 may support format translation to java script object notation (JSON), eXtensible markup language (XML), comma separated value CSV, Tableau Workbook (TBWX), hyper-text markup language (HTML) or other formats. The data export layer 160 may also support transfer of the activation timetable in one or more states, such as flat file transfers, streaming transfers, web service access, internet protocol transfers, or other transfers.

Additionally or alternatively, the ATSL 200 may initiate deployment via the prescriptive engine layer 150 through direct transfer, direct network access, or other non-export transfer.

Figure 3:
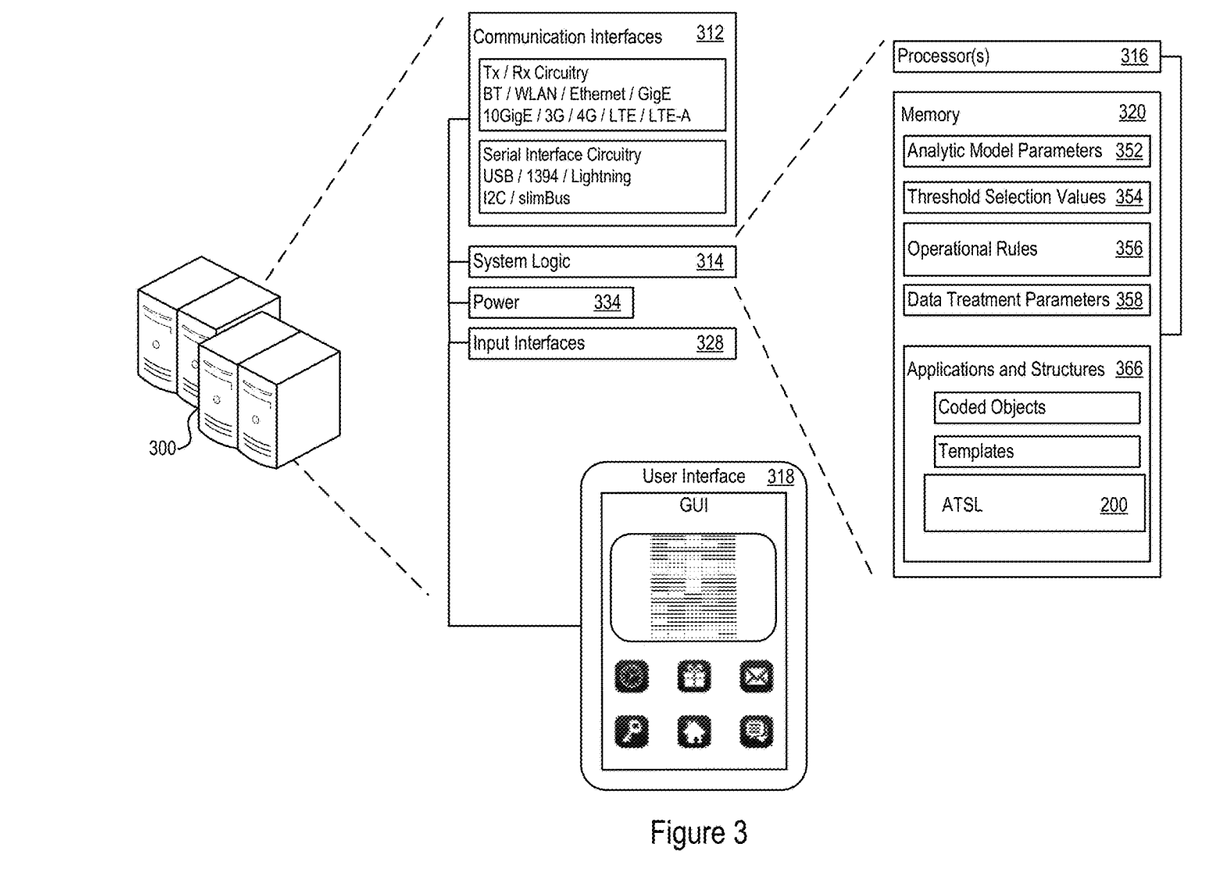
FIG. 3 shows an example specific execution environment for the activation timetable stack of FIG. 1.

FIG. 3 shows an example specific execution environment 300 for the activation timetable stack 100 described above. The execution environment 300 may include system logic 314 to support execution of the multiple layers of activation timetable stack 100 described above. The system logic may include processors 316, memory 320, and/or other circuitry.

The memory 320 may include analytic model parameters 352, threshold selection values 354, operational rules 356, and data treatment parameters 358. The memory 320 may further include applications and structures 366, for example, coded objects, machine instructions, templates, or other structures to support forward utilization data generation, activation state flagging, era variable identification or other tasks described above. The applications and structures may implement the ATSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I²C, slimBus, or other serial interfaces. The execution environment 300 may include power functions 334 and various input interfaces 328. The execution environment may also include a user interface 318 that may include human-to-machine interface devices and/or graphical user interfaces (GUI). In various implementations, the system logic 314 may be distributed over multiple physical servers and/or be implemented as a virtual machine.

In some cases the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the activation timetable stack 100, of the execution environment onto the hardware resources. In some cases, a manifest may be stored as a preference file such as a YAML (yet another mark-up language), JSON, or other preference file type.

Referring now to FIG. 4, an example user interface 400 is shown. The example user interface 400 includes an example graphical representation 410 of an activation timetable, and an example informational panel 430. The graphical representation 410 may display activation states 412, 416 for timeslots 422 of computing resources 424. For example, the graphical representation 410 may be implemented to display activation states for multiple or all computing resources included in an activation timetable (e.g., a master timetable view, functional group timetable view, multiple operator selected computing resource view, or other computing resource group view). The activation states, may for example be displayed as discrete states 412, 416 (e.g., ON or OFF).

Figure 5:
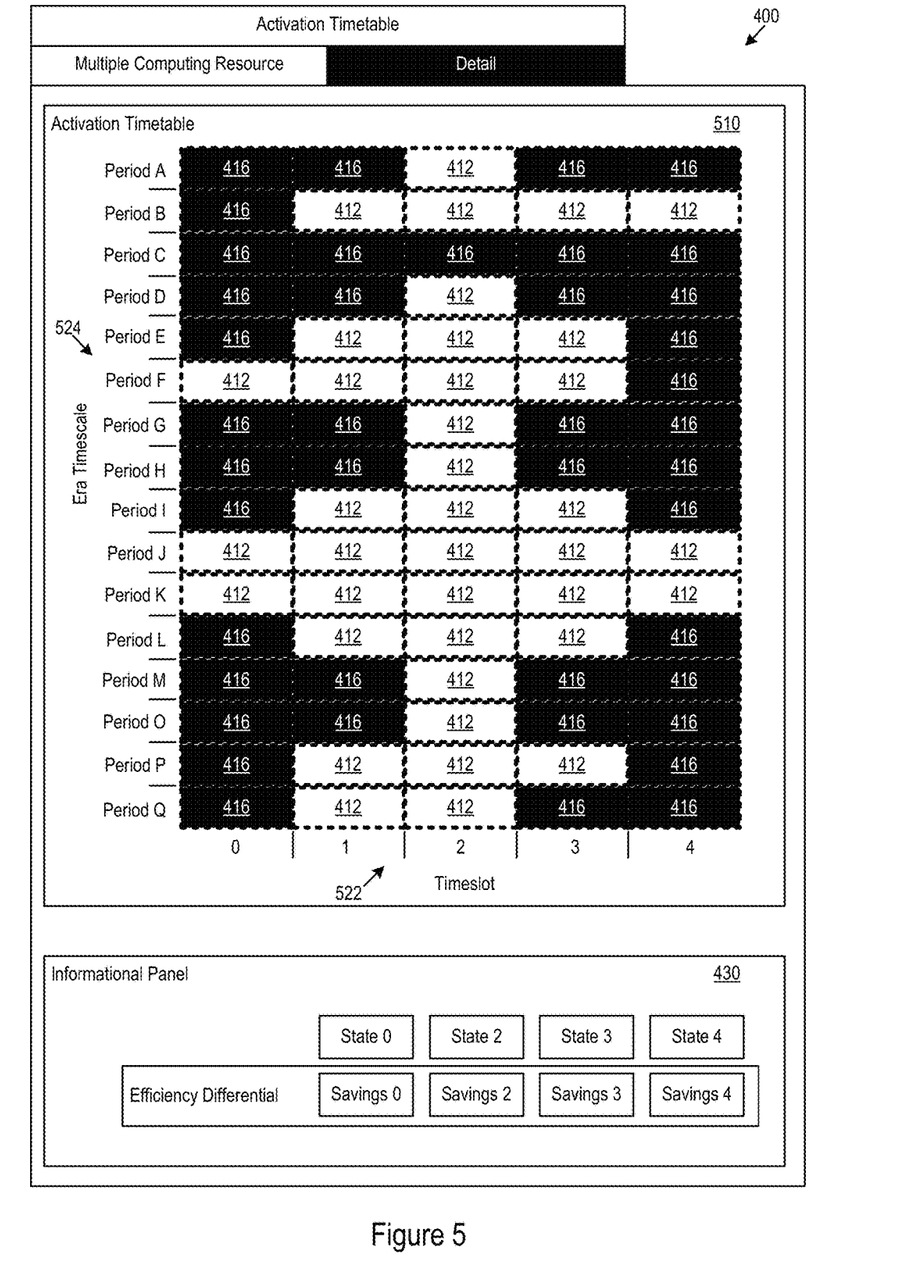
FIG. 5 shows an alternate view of the example user interface of FIG. 4.

FIG. 5 shows an alternate view of the example user interface 400. The alternate view includes a graphical representation 510 of the activation timetable. The graphical representation 510 may display timeslots 522 in repeating periods over an era timescale 524 for a single computing resource (e.g., a detail timetable view). In an illustrative example, for an hour-long timeslot, each timeslot hour-long over the course of a month (e.g., the era timescale) may be displayed in the graphical representation. In the example, the rows of the graphical representation may each represent a day with 24 timeslots, each one hour long. The graphical representation may include 28, 30, or 31 rows to represent the days in the month. Accordingly, era timescales may be viewed in the graphical representation 510 without obscuring the individual timeslots.

In some cases, the example user interface 400 may include multiple graphical representations (e.g., 410, 510). For example, a master timetable view may be presented alongside one or more detailed timetable views, multiple detailed timetable views may be presented without a master timetable view, multiple group views may be presented, or some combination thereof.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system comprises: network interface circuitry configured to: receive historical utilization data for a set of virtual machines; receive tagging data defining a functional grouping for a first virtual machine of the set of virtual machines; receive consumption metric data for the set of virtual machines; receive a threshold selection value for the functional grouping; and send an activation timetable to a host interface configured to control activation states for at least the first virtual machine; and activation timetable circuitry in data communication with the network interface circuitry, the activation timetable circuitry configured to execute an activation timetable stack, the activation timetable stack comprising: a data staging layer; an input layer; a configuration layer; a transformation layer; a data treatment layer; and a prescriptive engine layer; the activation timetable circuitry configured to: parse, at the input layer, the historical utilization data, the consumption metric data, and tagging data to generate time-scaled pattern data; store, via a database operation at the data staging layer, the time-scaled pattern data; access, at the transformation layer, the time-scaled pattern data using a memory resource provided by the data staging layer; identify, at the transformation layer, an era variable indicative of utilization on an era timescale; set, at the configuration layer, an activation threshold for the first virtual machine responsive to the threshold selection value; pass the era variable from the transformation layer to the data treatment layer; responsive to the time-scaled pattern data, determine an associated value for an era variable for an activation timeslot; flag, at the prescriptive engine layer, the activation states based at least in part on the associated value and the activation threshold; generate, at the prescriptive engine layer, the activation timetable for the set of virtual machines, the activation timetable defining activation states for the first virtual machine; and initiate deployment of the activation timetable by causing the network interface circuitry to send the activation timetable to the host interface.

A2 The system of example A1, where the timeslot comprises, a second timescale, a minute timescale, an hour timescale, a day timescale, a week timescale or any combination thereof.

A3 The system of example A1 or A2, where the era timescale comprises an annual timescale, a seasonal timescale, a quarterly timescale, a monthly timescale, a weekly timescale, a daily timescale, or any combination thereof.

A4 The system of any of examples A1-A3, where the activation timetable circuitry is configured to generate, at the prescriptive engine layer, a user interface comprising a graphical representation of at least a portion of the activation timetable.

A5 The system of example A4, where the user interface is configured to allow input of an operator-initiated change to the activation states.

A6 The system of example A5, where the user interface allows input of the operator-initiated change through operator selection of the activation timeslot.

A7 The system of any of examples A4-A6, where the user interface comprises an informational panel configured to display an efficiency differential comparing implementation of the activation threshold to non-implementation of the activation threshold.

A8 The system of example A7, where the informational panel is further configured to display a predicted effect on the efficiency differential corresponding to a specific change to the activation threshold.

A9 The system of claim 1, where the activation timetable circuitry is further configured to, after flagging the activation states, alter an activation state for the activation timeslot responsive to an adjacent activation state for an adjacent timeslot and an intelligent bucket analysis.

B1 In an example, a method comprises: at network interface circuitry: receiving historical utilization data for a set of virtual machines; receiving tagging data defining a functional grouping for a first virtual machine of the set of virtual machines; receiving consumption metric data for the set of virtual machines; and receiving a threshold selection value for the functional grouping; and at activation timetable circuitry in data communication with the network interface circuitry: parsing, at an input layer of an activation timetable stack executing on the activation timetable circuitry, the historical utilization data, the consumption metric data, and tagging data to generate time-scaled pattern data; storing, via a database operation at a data staging layer of the activation timetable stack, the time-scaled pattern data; accessing, at a transformation layer of the activation timetable stack, the time-scaled pattern data using a memory resource provided by the data staging layer; identifying, at the transformation layer, an era variable indicative of utilization on an era timescale; setting, at a configuration layer of the activation timetable stack, an activation threshold for the first virtual machine responsive to the threshold selection value; passing the era variable from the transformation layer to a data treatment layer of the activation timetable stack; responsive to the time-scaled pattern data determining an associated value for an era variable for an activation timeslot; flagging, at a prescriptive engine layer of the activation timetable stack, activation states for the first virtual machine based at least in part on the associated value and the activation threshold; and generating, at the prescriptive engine layer of the activation timetable stack, an activation timetable for the set of virtual machines, the activation timetable defining activation states for the first virtual machine; and sending, via the network interface circuitry, the activation timetable to a host interface configured to control the activation states for at least the first virtual machine.

B2 The method of example B1 further comprising, generating, at the prescriptive engine layer, a user interface comprising a graphical representation of at least a portion of the activation timetable.

B3 The method of example B2 further comprising, receiving, via the user interface, input of an operator-initiated change to the activation states.

B4 The method of example B3, where receiving the input of the operator-initiated change comprises receiving an operator selection of the activation timeslot.

B5 The method of any of examples B1-B4, further comprising causing, on an informational panel of the user interface, display of an efficiency differential comparing implementation of the activation threshold to non-implementation of the activation threshold.

B6 The method of example B5, further comprising causing, on the informational panel, display of a predicted effect on the efficiency differential corresponding to a specific change to the activation threshold.

C1 In an example, a product comprises: a machine-readable medium other than a transitory signal; and instructions stored on the machine-readable medium, the instructions configured to, when executed, cause a machine to: at network interface circuitry: receive historical utilization data for a set of virtual machines; receive tagging data defining a functional grouping for a first virtual machine of the set of virtual machines; receive consumption metric data for the set of virtual machines; and receive a threshold selection value for the functional grouping; and send an activation timetable to a host interface configured to control activation states for at least the first virtual machine; and at activation timetable circuitry in data communication with the network interface circuitry: parse, at an input layer of an activation timetable stack executing on the activation timetable circuitry, the historical utilization data, the consumption metric data, and tagging data to generate time-scaled pattern data; store, via a database operation at a data staging layer of the activation timetable stack, the time-scaled pattern data; access, at a transformation layer of the activation timetable stack, the time-scaled pattern data using a memory resource provided by the data staging layer; identify, at the transformation layer, an era variable indicative of utilization on an era timescale; set, at a configuration layer of the activation timetable stack, an activation threshold for the first virtual machine responsive to the threshold selection value; pass the era variable from the transformation layer to a data treatment layer of the activation timetable stack; responsive to the time-scaled pattern data determine an associated value for an era variable for an activation timeslot; flag, at a prescriptive engine layer of the activation timetable stack, activation states for the first virtual machine based at least in part on the associated value and the activation threshold; and generate, at the prescriptive engine layer of the activation timetable stack, the activation timetable for the set of virtual machines, the activation timetable defining activation states for the first virtual machine; and initiate deployment of the activation timetable by causing the network interface circuitry to send the activation timetable to the host interface.

C2 The product of example C1, where the timeslot comprises, a second timescale, a minute timescale, an hour timescale, a day timescale, a week timescale or any combination thereof.

C3 The product of example C1 or C2, where the era timescale comprises an annual timescale, a seasonal timescale, a monthly timescale, a weekly timescale, or any combination thereof.

C4 The product of any of examples C1-C3, where the instructions are further configured to cause the machine to generate, at the prescriptive engine layer, a user interface comprising a graphical representation of at least a portion of the activation timetable.

D1 A method implemented by operation of a system of any of examples A1-A9.

E1 A product comprising instructions stored on a machine readable medium, the instructions configured to cause a machine to implement the method of example D1.

Various implementations have been specifically described. However, many other implementations are also possible.

What is claimed is:

1. A system comprising:
   network interface circuitry configured to:
      receive historical utilization data for a set of virtual machines;
      receive tagging data defining a functional grouping for a first virtual machine of the set of virtual machines;
      receive consumption metric data including cost metrics for the set of virtual machines;
      receive a threshold selection value for the functional grouping, the threshold selection value including a target efficiency differential that identifies a difference in ratios of utilization time to non-utilization time for the set of virtual machines and further weights the set of virtual machines based on the consumption metric data; and
      send an activation timetable to host interface circuitry configured to control activation states for at least the first virtual machine; and
   activation timetable circuitry in data communication with the network interface circuitry, the activation timetable circuitry configured to execute an activation timetable stack,
      the activation timetable stack comprising:
         a data staging layer;
         an input layer;
         a configuration layer;
         a transformation layer;
         a data treatment layer; and
         a prescriptive engine layer;
      the activation timetable circuitry configured to:
         parse, at the input layer, the historical utilization data, the consumption metric data, and tagging data to generate time-scaled pattern data;
         store, via a database operation at the data staging layer, the time-scaled pattern data;
         access, at the transformation layer, the time-scaled pattern data using a memory resource provided by the data staging layer;

identify, at the transformation layer, an era variable indicative of utilization on an era timescale;

set, at the configuration layer, an activation threshold for the first virtual machine responsive to the threshold selection value;

pass the era variable from the transformation layer to the data treatment layer;

responsive to the time-scaled pattern data determine an associated value for an era variable for an activation timeslot;

flag, at the prescriptive engine layer, the activation states based at least in part on the associated value and the activation threshold;

after flagging the activation states, alter an activation state for the activation timeslot responsive to an adjacent activation state for an adjacent timeslot and an intelligent bucket analysis;

generate, at the prescriptive engine layer, the activation timetable for the set of virtual machines, the activation timetable defining activation states for the first virtual machine; and initiate deployment of the activation timetable by causing the network interface circuitry to send the activation timetable to the host interface circuitry.

2. The system of claim 1, where the era timescale comprises an annual timescale, a seasonal timescale, a quarterly timescale, a monthly timescale, a weekly timescale, a daily timescale, or any combination thereof.

3. The system of claim 1, where the activation timetable circuitry is configured to generate, at the prescriptive engine layer, a user interface comprising a graphical representation of at least a portion of the activation timetable.

4. The system of claim 3, where the user interface allows input of an operator-initiated change to the activation states.

5. The system of claim 4, where the user interface allows input of the operator-initiated change through operator selection of the activation timeslot.

6. The system of claim 3, where the user interface comprises an informational panel to display an efficiency differential comparing implementation of the activation threshold to non-implementation of the activation threshold.

7. The system of claim 6, where the informational panel allows display of a predicted effect on the efficiency differential corresponding to a specific change to the activation threshold.

8. A method comprising:
at network interface circuitry:
receiving historical utilization data for a set of virtual machines;
receiving tagging data defining a functional grouping for a first virtual machine of the set of virtual machines;
receiving consumption metric data including cost metrics for the set of virtual machines; and
receiving a threshold selection value for the functional grouping, the threshold selection value including a target efficiency differential that identifies a difference in ratios of utilization time to non-utilization time for the set of virtual machines and further weights the set of virtual machines based on the consumption metric data; and
at activation timetable circuitry in data communication with the network interface circuitry:
parsing, at an input layer of an activation timetable stack executing on the activation timetable circuitry, the historical utilization data, the consumption metric data, and tagging data to generate time-scaled pattern data;

storing, via a database operation at a data staging layer of the activation timetable stack, the time-scaled pattern data;

accessing, at a transformation layer of the activation timetable stack, the time-scaled pattern data using a memory resource provided by the data staging layer;

identifying, at the transformation layer, an era variable indicative of utilization on an era timescale;

setting, at a configuration layer of the activation timetable stack, an activation threshold for the first virtual machine responsive to the threshold selection value;

passing the era variable from the transformation layer to a data treatment layer of the activation timetable stack;

responsive to the time-scaled pattern data determining an associated value for an era variable for an activation timeslot;

flagging, at a prescriptive engine layer of the activation timetable stack, activation states for the first virtual machine based at least in part on the associated value and the activation threshold;

after flagging the activation states, altering an activation state for the activation timeslot responsive to an adjacent activation state for an adjacent timeslot and an intelligent bucket analysis; and generating, at the prescriptive engine layer, an activation timetable for the set of virtual machines, the activation timetable defining activation states for the first virtual machine; and sending, via the network interface circuitry, the activation timetable to a host interface configured to control the activation states for at least the first virtual machine.

9. The method of claim 8 further comprising, generating, at the prescriptive engine layer, a user interface comprising a graphical representation of at least a portion of the activation timetable.

10. The method of claim 9 further comprising receiving, via the user interface, input of an operator-initiated change to the activation states.

11. The method of claim 10, where receiving the input of the operator-initiated change comprises receiving an operator selection of the activation timeslot.

12. The method of claim 9, further comprising causing, on an informational panel of the user interface, display of an efficiency differential comparing implementation of the activation threshold to non-implementation of the activation threshold.

13. The method of claim 12, further comprising causing, on the informational panel, display of a predicted effect on the efficiency differential corresponding to a specific change to the activation threshold.

14. A product comprising:
a non-transitory machine-readable medium; and
instructions stored on the non-transitory machine-readable medium, the instructions configured to, when executed, cause a machine to:
at network interface circuitry:
receive historical utilization data for a set of virtual machines;
receive tagging data defining a functional grouping for a first virtual machine of the set of virtual machines;

receive consumption metric data including cost metrics for the set of virtual machines; and receive a threshold selection value for the functional grouping, the threshold selection value including a target efficiency differential that identifies a difference in ratios of utilization time to non-utilization time for the set of virtual machines and further weights the set of virtual machines based on the consumption metric data; and send an activation timetable to host interface circuitry configured to control activation states for at least the first virtual machine; and at activation timetable circuitry in data communication with the network interface circuitry:

parse, at an input layer of an activation timetable stack executing on the activation timetable circuitry, the historical utilization data, the consumption metric data, and tagging data to generate time-scaled pattern data;

store, via a database operation at a data staging layer of the activation timetable stack, the time-scaled pattern data;

access, at a transformation layer of the activation timetable stack, the time-scaled pattern data using a memory resource provided by the data staging layer;

identify, at the transformation layer, an era variable indicative of utilization on an era timescale;

set, at a configuration layer of the activation timetable stack, an activation threshold for the first virtual machine responsive to the threshold selection value;

pass the era variable from the transformation layer to a data treatment layer of the activation timetable stack;

responsive to the time-scaled pattern data determine an associated value for an era variable for an activation timeslot;

flag, at a prescriptive engine layer of the activation timetable stack, activation states for the first virtual machine based at least in part on the associated value and the activation threshold;

after flagging the activation states, alter an activation state for the activation timeslot responsive to an adjacent activation state for an adjacent timeslot and an intelligent bucket analysis; and generate, at the prescriptive engine layer, the activation timetable for the set of virtual machines, the activation timetable defining activation states for the first virtual machine; and initiate deployment of the activation timetable by causing the network interface circuitry to send the activation timetable to the host interface circuitry.

15. The product of claim 14, where the activation timeslot comprises, a second timescale, a minute timescale, an hour timescale, a day timescale, a week timescale or any combination thereof.

16. The product of claim 14, where the era timescale comprises an annual timescale, a seasonal timescale, a quarterly timescale, a monthly timescale, a weekly timescale, a daily timescale, or any combination thereof.

17. The product of claim 14, where the instructions are further configured to cause the machine to generate, at the prescriptive engine layer, a user interface comprising a graphical representation of at least a portion of the activation timetable.

18. The product of claim 17, where the user interface allows input of an operator-initiated change to the activation states.

19. The product of claim 18, where the user interface allows input of the operator-initiated change through operator selection of the activation timeslot.

20. The product of claim 18, where the user interface comprises an informational panel to display an efficiency differential comparing implementation of the activation threshold to non-implementation of the activation threshold.

\* \* \* \* \*